Patented Sept. 25, 1945

2,385,372

UNITED STATES PATENT OFFICE 2,385,372

PRODUCTION OF RESIN

Philip Hamilton Rhodes, Portland, Maine, assignor to Pennsylvania Coal Products Company, Petrolia, Pa., a corporation of Pennsylvania No Drawing. Application January 13, 1942,
Serial No. 426,629

20 Claims. (Cl. 260—54)

The present invention relates to the preparation of resins, the essential component of which is a dihydroxy benzene aldehyde resin. More specifically, the present invention relates to the preparation of a resin, the essential component of which is a resorcin-aldehyde resinous condensation product.

It has been discovered that when the dyhydroxy benzene-aldehyde resins are produced, the reaction between the dihydroxy benzene, as for example, resorcin, and the aldehyde, as for example, formaldehyde, is so rapid that the water produced by the reaction is difficult to remove. This is in contradistinction to the course of the reaction when monohydric phenols are condensed with aldehydes. There, the reaction is relatively slow and the dehydration of the reaction products is successfully accomplished with the observance of ordinary precautions.

In the preparation of two-step permanently fusible resins from a dihydroxy benzene and an aldehyde, if a catalyst is added during the early stages of the reaction, the reaction mass thickens to such an extent as to make it exceedingly difficult to remove the water produced by the reaction from the reaction product by distillation or any of the equivalent prior art processes. Stated differently, substantially complete dehydration is not accomplished. As a general rule the resinous reaction mass should be dehydrated to a point where it contains less than 1% of water, and preferably .5 to .75% of water.

It has also been discovered that when the dihydroxy benzene-aldehyde reaction product has not been substantially completely dehydrated, that the final reaction product sets more slowly, and exhibits a decided tendency to form discontinuous films, the absence of which is of decided importance when the resin reaction products herein disclosed are used as bonding and cementing mediums and especially as a bonding medium for abrasive components, and for the impregnation and bonding of laminated products.

It has also been discovered that the amount of water present in the resinous product produced by reacting the dihydroxy benzene with an aldehyde, as for example, a resorcin-formaldehyde resin, affects the stability of a solution in which the resin is dissolved. For example, experiments show that when the two-step resin compound contains 5% of water and is mixed with 8 to 12% of methylene-containing agent to form a heat reactive resin compound, a 50% solution of the so produced resin compound keeps only for a few hours. When the water content is reduced to about .6%, the same solution will keep from 3 to 4 days without gellation. If the resin solution can be kept for a substantial period of time, as for example, at least 3 to 4 days, then the resin has been "stabilized."

The absence of substantial quantities of water in the condensation products herein set forth, as for example, a resorcin formaldehyde resin, is essential in many of the industrial applications of the resin. When the herein disclosed resins are used as cementing or bonding agents in the production of abrasive articles such as grinding wheels and the like, the presence of water over a predetermined amount tends to cause steam to form during curing and this, in turn, causes blistering of the abrasive article or piece.

It has been discovered that the water component of resins produced by combining a dihydroxy benzene with an aldehyde, as for example, formaldehyde, can be substantially reduced by permitting the reaction of the dihydroxy benzene and the aldehyde to proceed until the major portion of the reaction has been completed and until a substantial portion of the aldehyde has reacted. Thereafter, the catalyst, either acid or alkaline, is added to the reaction mass. Stated differently, the catalyst is added toward the end of the reaction, whereupon the last increment of the aldehyde reacts with the dihydroxy benzene in the presence of the catalyst and the resin reaction product maintains a physical condition permitting the water to be removed by distillation, as hereinafter set forth more in detail, or by an equivalent prior art process.

When the dihydroxy benzene reacts with an aldehyde, as for example, formaldehyde, or any of the equivalent prior art aldehydes, the reacting ingredients react so quickly that side reactions occur and by-products are introduced into the end product. It has been discovered that the rapidity of the reaction of the reacting ingredients, one with the other, may be decreased by having present during the reaction a monohydric phenol thereof typified by phenol per se, cresol or xylenol, or a substitution product of a monohydric phenol, including the substitution products of the phenols above set forth, and others well known in the art.

It has also been discovered that not only does the presence of a monohydric phenol or its substitution product reduce the rapidity of the reaction between the dihydroxy benzene, and aldehydes, but that the resinous product produced by the reaction of an aldehyde with a dihydroxy benzene and a monohydric phenol and/or substitution products thereof has a better filming effect, which many cases may be advantageously utilized, as for example, in the production of laminated articles of cloth, paper, or mixtures thereof; in the production of abrasive articles, including sandpaper; and in the production of articles wherein layers of wood, including plywood, are united by the herein disclosed resin adhesive.

The herein disclosed method in one of its forms is directed to producing a permanently fusible dihydroxy benzene-aldehyde resin comprising initiating reaction between the dihydroxy benzene and the aldehyde, and then adding a catalyst which may be acid or alkaline, but preferably acid, to the reaction mass toward the end of the reaction before any substantial gellation occurs and/or the reaction mass thickens, and before all of the aldehyde has reacted. The remaining small amount of aldehyde, as for example, formaldehyde, is then reacted with the dihydroxy benzene in the presence of the catalyst and the reaction mass is then dehydrated by distillation or equivalent process to remove water from the resulting liquid resin.

In the above method, instead of using a dihydroxy benzene, as for example, resorcin, other dihydroxy benzenes may be used, as for example, catechol and hydroquinone. In the preferred form, the aldehyde, as for example, formaldehyde, is present in an amount sufficient to combine with only a portion of the dihydroxy benzene and then after the initial reaction is started, additional aldehyde is added to the partially reacted mass, whereupon the additional aldehyde starts to react with the unreacted dihydroxy benzene. The catalyst is added to the reaction mass toward the end of the reaction and the aldehyde which has not reacted is then reacted with the dihydroxy benzene in the presence of the catalyst. Employing this procedure, the reaction mass does not thicken and gellation does not occur, and therefore the resulting liquid resin may be dehydrated so as to bring the water content thereof to less than 1% and preferably to between .5 and .75%.

The invention will be specifically disclosed in connection with the following example, which is to be taken as illustrative and not by way of limitation.

About 2500 grams of resorcin are reacted with 500 grams of 37% formaldehyde solution in a suitable reaction vessel. Preferably, the reaction vessel comprises a steam jacketed kettle equipped with a horse-shoe agitator, a reflux condenser, and an addition valve. The formaldehyde is added to the resorcin present in the vessel and thereafter the jacket is gradually heated so that the temperature of the resorcin formaldehyde mixture is slowly raised to 100° C. as the resorcin goes into solution, great care being taken that the mixture does not become too ebullient, and boil over. As the temperature reaches 100° C., the steam jacket is taken out of circuit and then about 750 grams of 37% formaldehyde are gradually added to the kettle. The rate of addition is governed by the temperature of the mixture. The particular mixture above set forth is not permitted to become heated to over 110° C., no boiling over occurring. As the formaldehyde is added to the partially reacted mass, heat is generated and the rate of reaction is controlled so that the heat given off is not sufficient to cause the mass to boil over. Usually the formaldehyde is added gradually in increments, the time of addition being usually about 1¼ to 1½ hours. However, this will vary with the size of the reaction mass and on large scale production, may take as long as two or three hours.

During the last of the addition of the formaldehyde to the partially reacted mass, the rate of reaction slows down and there usually remains in the reaction mass about 5 to 10% of formaldehyde which has not yet combined with the resorcin. In order to combine this last increment of uncombined formaldehyde without successive advancement of the resin already formed, a catalyst is added as soon as the addition of the formaldehyde is complete. If this is not done and the formaldehyde is completely combined by the long application of heat, part of the resin formed in the initial stages of the reaction will advance so far as to threaten gellation and perhaps inhibit the complete removal of the water. In the above, no catalyst is present. However, if a catalyst is added in the early stages of the reaction, the initial resin formation advances before the final increment of formaldehyde is tied up and thickens the mass so that it is difficult to remove the water from the reaction mass.

If the total time of running the above resin batch from the quantities set forth is 2½ to 2¾ hours, the extent of dehydration is such that the residual moisture remaining in the processed resin varies between about .5 to .7%. However, if the time of the reaction is slowed down to 3¼ to 3½ hours, the residual moisture may be on the average about 1 to 1.5%. When utilizing larger batches and different processing apparatus, the time of a slow reaction and the time of a rapid reaction may vary, but the relative dehydration results will remain approximately comparable; that is, for the shorter reaction period, the dehydration will be more complete.

The addition of the catalyst toward the end of the reaction ties up the last amounts of formaldehyde quickly before the resin already formed has a chance to advance too far and prevent the complete dehydration of the final product. When all the formaldehyde has been added, there is then added a suitable acid catalyst such as oxalic acid, acetic acid, citric acid, boric acid or any of the mineral acids such as sulfuric acid and hydrochloric acid. Specifically, to the mixture above set forth there may be added sufficient oxalic acid crystals to assist in completing the reaction. When the reacting ingredients are present in the proportions above set forth, 5 grams of oxalic acid crystals are sufficient to complete the reaction. Instead of adding the catalyst in a dry state, the latter may be added in solution, as for example, the oxalic acid crystals may be dissolved in water or equivalent medium.

During the time that the second addition of formaldehyde is added, heat is furnished by the exothermic reaction of the formaldehyde with the resorcin. At about the time the catalyst is added, the mass begins to slightly cool and the jacket is reheated, sufficient steam being bled in to rapidly reflux the kettle contents. As soon as the mixture has reached a smooth rapid reflux the condenser is shifted to a water jacketed downward condenser connected to a trap and vacuum pump to distill off the water from the reaction mass. The temperature is maintained by steam pressure on the jacket at about 100° C. during the distillation of the water and a vacuum of about 28 inches is maintained on the system. Distillation is continued with about 50 pounds of steam pressure on the jacket and the temperature gradually rises to 125° to 130° C. at the end of the dehydration period. The dehydration is terminated when the temperature reaches 125° to 130° C. and the distillation is practically stopped. This can be ascertained by checking on the condenser output. When it slows down to 6 or 10 drops per minute, which takes about 45 minutes using the proportions herein set forth, this may be taken as an indication that the dehydration step has terminated. At this point, the agitator is stopped, the kettle is opened, and the liquid resin is poured off. This solidifies to a brittle resin containing less than 1% moisture and usually not over 0.65% as determined by the A. S. T. M. method. Preferably, the reaction is carried out between .67 of a mol of formaldehyde and one mol of resorcin in the presence of a suitable acid catalyst added as soon as the final portion of the formaldehyde or other aldehyde has been added. Although the preferred molecular ratio of formaldehyde to resorcin is 0.67 to 1.0, other ratios from 0.5 to 1.0 to 0.9 to 1.0 may be employed. Instead of using formaldehyde, other prior art aldehydes may be used such as acetaldehyde, paraldehyde, propionaldehydes, the butyl aldehydes, the furfuralaldehydes, and the like.

Mild alkaline catalysts such as .5% sodium hydroxide, .2% borax, azoxy-toluidine, aniline and other alkaline catalysts may be used, the latter being preferably added at the same point as the herein described acid catalyst is added; namely, after the complete addition of the formaldehyde or equivalent aldehyde.

The percentage of catalysts is taken upon the amount of dihydroxy benzene, as for example, resorcin, used in carrying out the reaction. In general, the catalyst will vary between about .1% to 2%. This is set forth by way of illustration and as the preferred percentage of catalyst. Obviously, however, the amount of catalyst used will vary depending upon the character of the reacting constituents and the specific manner in which the reaction is carried out.

It is further desired to point out that the amount of catalyst added when the last increment of formaldehyde has been added to the partly reacted phenolic aldehyde mass is also influenced to a very substantial extent by the ultimate use of the resin manufactured by the method herein set forth.

If, for example, the resin is to be used as a bonding medium for abrasive articles, a minimum amount of catalyst desirably should be employed to tie up all the formaldehyde, as for example, .1 to .3% taken on the weight of the phenolic compound used in forming the resin. Although in some cases where the resin is to be used for purposes other than bonding abrasives, .6% or even higher amounts of oxalic acid may be used. This range allows the resin to be dehydrated to the low value required. Using oxalic acid as the catalyst, the greater the amount used, the longer it takes to achieve dehydration and a greater amount of residual moisture is left in the resin. When producing resins for laminating purposes, and where the resin is very frequently made into the form of a varnish, tests indicate that resins made with about 0.6% of oxalic acid seem to have the maximum stability when used in the form of varnishes. Tests show that when the herein described resins are made in the presence of an oxalic catalyst in an amount less than .2% or in an amount greater than 1.0% taken on the weight of the phenolic compound used in producing the resin, that resin solutions thereof often have a useful life 25 to 50% less than resins made with .6% of an oxalic acid catalyst, said percentage inducing maximum stability in varnishes made with the herein described resins.

In the above example whereby 2500 grams of resorcin are reacted with about 500 grams of 37% formaldehyde for a portion of the resorcin, there is substituted a monohydric phenol so that the mixture of resorcin and phenol reacts with the formaldehyde solution. In one form of the invention, 2250 grams of resorcin were mixed with 216 grams of pure phenol or 250 grams of crude cresylic acid and the mixture reacted with the formaldehyde solution. The resulting mass was then treated in a manner identical with that set forth for the production of the resorcin-formaldehyde resin. Crude cresylic acid contains a small amount of phenol, the three cresols, ortho, meta, and para, and usually considerable amounts of higher phenols including various xylenols.

The final resins which were co-polymers of the resorcin and phenol-aldehyde combinations melted at 105° to 120° C. as compared with 99° to 100° C. for the straight resorcin-formaldehyde resin, depending on the characteristics of the particular phenol employed. About five degrees higher temperature was required to get the same rate of cure as on the straight resorcin resin and the general appearance of the cured films were tougher and more homogeneous than corresponding films from the resorcin aldehyde combination. The mixed resin was made from a mixture of 90% resorcin and 10% monohydric phenol. It is within the province of the present invention to combine the dihydroxy benzene, as for example, resorcin, catechol, hydroquinone, or the like with varying percentages of the monohydric phenol, as for example, the dihydroxy benzene may comprise 80% resorcin and the monohydric phenol may comprise 20% phenol or crude commercial cresylic acid.

It has been ascertained that when a monohydric phenolic compound including derivatives and substitution products of phenol and its higher homologues used in the production of phenolic resins is present in excess of 20 to 25%, the addition of the catalyst substantially at the end of the resin forming reaction substantially as herein set forth produces a decided tendency for the reaction product to prematurely set up. Therefore the percentage of monohydric phenolic compounds which may be added when the catalyst is added at the end of the reaction in the manner herein set forth and for the purpose herein set forth, is in a sense critical.

The dihydroxy benzene and the monohydric phenol may be combined in various proportions and reacted with an aldehyde such as, for example, formaldehyde, the methods herein set forth being used; and this reaction product is easily controlled during the reaction period, has better filming effects, and which, after being made heat reactive by the addition of a methylene containing agent, has a curing temperature intermediate that of resorcin-aldehyde resins, as for example, resorcin formaldehyde resin and monohydric phenol or phenolic-aldehyde resins.

In some respects, this is a great advantage since it opens up an entirely new field for the production of articles utilizing a bonding medium, curing at an exceedingly low temperature, or at least at temperatures below 135° to 150° C., which are the curing temperatures necessary when using the prior art monohydric phenolic-aldehyde one- or two-step resins.

The compound produced by adding 8 to 12% hexamethylene tetramine, etc. to the resin as above set forth, is preferably dissolved in a mixture of equal parts of alcohol and acetone to give a solution containing from 35 to 50% solids content, depending upon the viscosity desired.

Straight solutions of these resin compounds or compositions in alcohol or acetone are unstable tending to gel within 24 to 60 hours after their preparation depending on the extent to which monohydric phenols have been used, straight resorcin resins being least stable. This, of course, is highly disadvantageous as the gelled resins cannot be efficiently utilized in the arts. It has been ascertained that the resin compound containing hexamethylene tetramine may be fairly well stabilized if the solutions thereof are fairly dilute; that is, for example, less than 40% of the resin is dissolved in 60% of the alcohol or the acetone. A solution diluted in accordance with the above will keep from about 2 to 4 days.

It was also ascertained that if instead of dissolving the final two-step resin compound or composition in straight alcohol or straight acetone, the resorcin-formaldehyde or equivalent resin compound is dissolved in a mixture of alcohol and acetone, preferably in equal amounts, that the resin solution is stabilized so that it will keep for a period of 2 weeks.

It was further ascertained that if a mixture of the resin solvents were used as a solvent medium and the solution were diluted so that it contained less than 40% of resin solids, that the so-prepared solution kept for a period of at least 3 or 4 weeks, with no gelling, indicating that the solution had become stabilized.

Instead of using a mixture of an alcohol and acetone, there may be used a mixture of the alcohols and any of the ketones and especially the low boiling point aliphatic ketones. Instead of using alcohol in admixture with a ketone, the alcohol may be used in admixture with a low boiling point aliphatic ester such as ethyl acetate or methyl acetate. The stabilizing solvent medium may comprise a mixture of ethyl acetate and acetone or methyl acetate and alcohol. The substituted ketones, typified by ethyl methyl ketone, may also be used in admixture with the alcohol.

These stabilized solutions of the two-step resin compounds or compositions prepared as herein set forth may be advantageously utilized in the production of laminated products such as laminated cloth or paper, or mixtures thereof, or in the production of plywood, or wherever the resin is used in combination with a medium to be bonded, said resin being in solution form.

In the production of plywood, the two-step resin compounds or compositions in the form of stabilized solutions may be advantageously used as the bonding medium between the wood plies, said solution preferably having added thereto extenders or film-forming agents commonly used in the prior art.

The dihydroxy benzenes, including resorcin, utilized in carrying out the present invention may be the commercial grades, or said dihydroxy benzenes including resorcin may contain appreciable percentages of monohydric phenols, as for example, phenol. The resorcin may also contain diresorcin.

While hexamethylene tetramine has been set forth as the most desirable hardening agent, it is desired to point out that the various oxy methylenes, paraform, or any polymer or homolog of formaldehyde may be used.

Plywood, other cellulosic laminae, and organic laminae which do not deteriorate at a temperature ranging between 210° and 220° F. may have interposed therebetween any of the resinous products above described. As the bonding adhesive, there may be used a two-step resin compound of the character herein disclosed, said resin being produced by reacting resorcinol and formaldehyde in the presence of oxalic acid as herein disclosed and to which 10 portions of a hardening agent such as hexamethylene tetramine has been added to 100 portions of resin. Four hundred grams of the solid resin compound may be dissolved in 600 grams of denatured alcohol, acetone or any other volatile solvent to provide a homogeneous solution. The proportion of resin used is merely illustrative, the criterion being that sufficient resin is present in the resin solution so that when the resin is applied by spray or a roller spreader, the required amount of bonding material is evenly distributed onto the surface of the sheet of material which is to be glued, as for example, wood, leather, plies of cardboard, and the like.

In general, it may be stated that the concentration of the solutions of the resin compound to which hexamethylene tetramine or its equivalent has been added may vary between 25 to 60% solids. The bonding adhesives herein described may be spread on one or both sides of the plywood or veneers. If the bonding adhesive is spread on both sides of a veneer, then an uncoated veneer layer is laid on both sides of the double coated veneer. These sheets or layers of coated plywood or other material are imposed on each other in a stack and pressed.

The invention may also be carried out by treating a sheet of paper 2 mils thick with a solution of any of the resin compounds herein set forth, the concentration of the solution and the amount of resin compound applied to the paper sheet being such that after drying, it contains 60 to 80 parts by weight of dry resin. The so impregnated sheet is then laid between wood veneers, dried to a normal water content, and the veneer assemblage pressed at usual pressures and cured at a temperature as low as 220° F.

The bonding resins herein described may be used for the bonding together of structures provided with ribs and dowels and may be used in the production of plywood structures of multiple veneers, the latter being glued with the resin herein set forth and assembled into structures by ribs and dowels glued with the same kind of glue.

In general, it may be stated that the curing temperature should vary between about 200 to about 220° F. For some purposes the temperature may be 210 to 215° F. These curing temperatures may be used when the straight dihydroxy benzene-aldehyde resin is used as the bonding medium for various materials which it is desired to bond or cement together. When the bonding medium is made from a mixture of a dihydric compound, as for example, a dihydroxy benzene compound and a monohydric phenol compound, as for example, phenol, the temperature of cure may be considerably above 220° F. In general, when the resin is made from a mixture of phenols or from a mixture of derivatives, the curing temperature may vary between 200 and 300° F., depending upon the amount of monohydric phenol present in the resin. For example, in some cases, the curing temperature may vary between 235 and 275° F. However, it is desired to indicate that exceedingly low temperatures may be used, said curing temperatures preferably being in the neighborhood of the boiling point of water or slightly lower.

In the production of airplane structures and boat structures, instead of the alternate plies or layers being of wood, there may be a layer of wood, then a layer of cotton fibers or cloth or asbestos, and then a layer of wood and another layer of cotton fibers or cloth or asbestos. In other words, it is not necessary that both plies be of wood. Only one ply need be of wood and in some cases, the invention may be carried out by using plies of cloth, cotton or other textile material or plies of inorganic material which may be mineral in character, typified by asbestos. Any of these materials or equivalent materials may be used, the only limitation being that the material must not be damaged at the temperature of curing which is in the neighborhood of 210° to 220° F.

The term "monohydric phenol" as used in the specification and in some of the claims is intended to cover not only the monohydric phenols, as for example, phenol per se $C_6H_5OH$, but the substituted phenols, as for example, cresol, which is methyl phenol, and the higher phenols including various xylenols.

In accordance with the present invention, there has been provided a method of producing a permanently fusible resin containing as its essential ingredient a dihydroxy benzene-aldehyde resin. This resin is produced by initiating reaction between a dihydroxy benzene or a dihydroxy benzene compound and an aldehyde. There is then added to the reaction mass a catalyst, the latter being added toward the end of the reaction before any substantial gellation occurs and before all of the aldehyde has reacted. Thereafter, the remainder of the aldehyde, as for example, formaldehyde, is reacted with the dihydroxy benzene constituent in the presence of the catalyst. The resulting liquid resin may then be distilled to dehydrate the same. More specifically, the aldehyde is added in an amount sufficient to combine only with a portion of the dihydroxy benzene. Then additional aldehyde is added to the partially reacted mass whereupon said additional aldehyde starts to react with the unreacted dihydroxy benzene compound. A catalyst is then added to the reaction mass toward the end of the reaction and the small amount of aldehyde remaining is reacted in the presence of the catalyst. The molecular ratio of the aldehyde to the dihydroxy benzene may vary between .5 to 0.9 of the former to 1.0 of the latter. It is preferred that the above described resin be dehydrated to a water content of less than 1.0%.

In an alternative form of the invention, a resin is produced by initiating reaction between an aldehyde and a mixture of a dihydroxy benzene or a dihydroxy benzene compound and a monohydric phenol or a monohydric phenol compound, the dihydroxy benzene component being preferably present in at least 75–80% of the total phenolic body. The aldehyde is present in an amount to combine with only a portion of the composite mixture of the dihydroxy benzene component and the monohydric phenol component. The partially reacted mass is then treated with additional aldehyde, as for example, formaldehyde or its equivalent, whereupon the additional aldehyde starts to react with the unreacted composite mixture. A catalyst is then added to the reaction mass toward the end of the reaction before all the aldehyde has reacted and before any substantial gellation of the reaction mass occurs. The small amount of unreacted aldehyde remaining is then reacted with the composite mixture in the presence of the catalyst. The resulting resins are dehydrated to a water content of less than 1.0% and preferably to .5 to .75%. The resin produced from the composite mixture may then be treated with a methylene-containing hardening agent to convert said resin into a potentially heat reactive product.

While certain acid or alkaline catalysts have been set forth as applicable in carrying out the present invention, it is desired to point out that the invention is not limited to the use of the particular catalyst set forth, and other inorganic and organic acid and alkaline catalysts may be used such as are well known in the prior art.

Having thus described the invention, what is claimed as new and desired to be secured by Letters Patent is:

1. The method of producing a permanently fusible resin containing as its essential ingredient a resorcin-aldehyde resin comprising initiating reaction between resorcin and an aldehyde by heating in the absence of a catalyst, adding a small amount of a catalyst selected from the group consisting of acid and alkaline catalysts to the reaction mass toward the end of the reaction before any substantial gelation occurs and all of the aldehyde is reacted, heat reacting the remainder of the aldehyde with the resorcin in the presence of the catalyst, the complete amount of aldehyde reacted during said steps being only sufficient to produce a permanently fusible resin, said reaction mass being maintained within a temperature range which assists in initiating the reaction and in thereafter continuing the same, and removing water from the resulting liquid resin.

2. The method of claim 1 in which the aldehyde is formaldehyde.

3. The method of producing a permanently fusible resin containing as its essential ingredient a resorcin-aldehyde resin comprising initiating reaction between resorcin and an aldehyde by heating in the absence of a catalyst, the aldehyde being present in an amount sufficient to only combine with a portion of the resorcin, adding additional aldehyde to the partially reacted mass whereupon the additional aldehyde starts to react with the unreacted resorcin, the complete amount of aldehyde added during said steps being only sufficient to produce a permanently fusible resin, adding a small amount of a catalyst selected from the group consisting of acid and alkaline catalysts to the reaction mass toward the end of the reaction before all the aldehyde is reacted, heat reacting the remainder of the aldehyde with the resorcin in the presence of the catalyst, said reaction mass being maintained within a temperature range which assists in initiating the reaction, and in thereafter continuing the same and removing water from the resulting liquid resin.

4. The method of producing a permanently fusible resin containing as its essential ingredient a resorcin-aldehyde resin comprising initiating reaction between resorcin and an aldehyde by heating in the absence of a catalyst, the aldehyde being present in an amount sufficient to only combine with a portion of the resorcin, adding additional aldehyde to the partially reacted mass whereupon the additional aldehyde starts to react with the unreacted resorcin, the complete amount of aldehyde added during said steps being only sufficient to produce a permanently fusible resin, adding a small amount of a catalyst selected from the group consisting of acid and alkaline catalysts to the reaction mass toward the end of the reaction before all the aldehyde is reacted, heat reacting the remainder of the aldehyde with the resorcin in the presence of the catalyst, said reaction mass being maintained within a temperature range which assists in initiating the reaction and in thereafter continuing the same, and dehydrating the liquid mass to a water content of less than 1%.

5. The method of claim 3 wherein the aldehyde is formaldehyde and the reaction mass is dehydrated to a water content of less than 1%.

6. The method of producing a permanently fusible resin comprising initiating reaction between an aldehyde, resorcin and a monohydric phenol by heating in the absence of a catalyst, the resorcin being present in an amount equal to at least 75% of the total phenolic body, adding a small amount of a catalyst selected from the group consisting of acid and alkaline catalysts to the reaction mass toward the end of the reaction before any substantial gelation occurs and all the aldehyde is reacted, heat reacting the remainder of the aldehyde with the phenolic mixture in the presence of the catalyst, the complete amount of aldehyde present during said steps being only sufficient to produce a permanently fusible resin, the reaction mass being maintained within a temperature range which assists in initiating the reaction and in thereafter continuing the same, and removing water from the resulting liquid resin.

7. The method of producing a permanently fusible resin containing as its essential ingredient a dihydroxy benzene-aldehyde resin comprising initiating reaction between a dihydroxy-benzene and an aldehyde by heating in the absence of a catalyst, adding a small amount of a catalyst selected from the group consisting of acid and alkaline catalysts to the reaction mass toward the end of the reaction before any substantial gelation occurs and all of the aldehyde is reacted, heat reacting the remainder of the aldehyde with the dihydroxy benzene in the presence of the catalyst, the complete amount of aldehyde reacted during said steps being only sufficient to produce a permanently fusible resin, said reaction mass being maintained within a temperature range which assists in initiating the reaction and in thereafter continuing the same, and removing water from the resulting liquid resin.

8. The method of producing a permanently fusible resin containing as its essential ingredient a dihydroxy benzene-aldehyde resin comprising initiating reaction between a dihydroxy benzene and an aldehyde by heating in the absence of a catalyst, adding a small amount of a catalyst selected from the group consisting of acid and alkaline catalysts to the reaction mass toward the end of the reaction before any substantial gelation occurs and all of the aldehyde is reacted, heat reacting the remainder of the aldehyde with the dihydroxy benzene in the presence of the catalyst, the complete amount of aldehyde reacted during said steps being only sufficient to produce a permanently fusible resin, said reaction mass being maintained within a temperature range which assists in initiating the reaction and in thereafter continuing the same, and dehydrating the reaction mass to a water content of less than 1%.

9. The method of producing a permanently fusible resin comprising initiating reaction between an aldehyde, a dihydroxy benzene and a monohydric phenol by heating in the absence of a catalyst, the polyhydric phenol being present in an amount equal to at least 75% of the total phenolic body, adding a small amount of a catalyst selected from the group consisting of acid and alkaline catalysts to the reaction mass toward the end of the reaction before any substantial gelation occurs and all the aldehyde is reacted, heat reacting the remainder of the aldehyde with the phenolic mixture in the presence of the catalyst, the complete amount of aldehyde reacted during said steps being only sufficient to produce a permanently fusible resin, the reaction mass being maintained within a temperature range which assists in initiating reaction and in thereafter continuing the same, and removing water from the resulting liquid resin.

10. The method of producing a permanently fusible resin comprising initiating reaction between an aldehyde, a dihydroxy benzene and a monohydric phenol by heating in the absence of a catalyst, the dihydroxy phenol being present in an amount equal to at least 75% of the total phenolic body, adding a small amount of a catalyst selected from the group consisting of acid and alkaline catalysts to the reaction mass toward the end of the reaction before any substantial gelation occurs and all the aldehyde is reacted, heat reacting the remainder of the aldehyde with the phenolic mixture in the presence of the catalyst, the complete amount of aldehyde reacted during said steps being only sufficient to produce a permanently fusible resin, the reaction mass being maintained within a temperature range which assists in initiating reaction and in thereafter continuing the same, and dehydrating the reaction mass to a water content of less than 1%.

11. The method of producing a permanently fusible resin containing as its essential ingredient a resorcin-aldehyde resin comprising initiating reaction between resorcin and an aldehyde by heating in the absence of a catalyst, adding a small amount of a catalyst selected from the group consisting of acid and alkaline catalysts to the reaction mass toward the end of the reaction before any substantial gelation occurs and all of the aldehyde is reacted, heat reacting the remainder of the aldehyde with the resorcin in the presence of the catalyst, the complete amount of aldehyde reacted during said steps being only sufficient to produce a permanently fusible resin, said reaction mass being maintained within a temperature range which assists in initiating the reaction and in thereafter continuing the same, and dehydrating the resulting mass to a water content of less than 1%.

12. The method of producing a permanently fusible resin comprising initiating reaction between an aldehyde, resorcin and a monohydric phenol by heating in the absence of a catalyst, the resorcin being present in an amount equal to at least 75% of the total phenolic body, adding a small amount of a catalyst selected from the group consisting of acid and alkaline catalysts to the reaction mass toward the end of the reaction before any substantial gelation occurs and all the aldehyde is reacted, heat reacting the remainder of the aldehyde with the phenolic mixture in the presence of the catalyst, the complete amount of aldehyde present during said steps being only sufficient to produce a permanently fusible resin, the reaction mass being maintained within a temperature range which assists in initiating the reaction and in thereafter continuing the same, and dehydrating the resulting mass to a water content of less than 1%.

13. The method of producing a permanently fusible resin containing as it essential ingredients a resorcin aldehyde resin comprising initiating reaction between resorcin and an aldehyde by heating in the absence of a catalyst, adding about 0.1% to about 2% of a catalyst selected from the group consisting of acid and alkaline catalysts to the reaction mass toward the end of the reaction before any substantial gelation occurs and all of the aldehyde is reacted, said percentage being taken on the weight of the resorcin, heat reacting the remainder of the aldehyde with the resorcin in the presence of the catalyst, the complete amount of aldehyde reacted during said steps being only sufficient to produce a permanently fusible resin, said reaction mass being maintained within a temperature range which assists in initiating the reaction and in thereafter continuing the same, and removing water from the resulting liquid resin.

14. The method of producing a permanently fusible resin comprising initiating reaction between an aldehyde, resorcin and a monohydric phenoyl by heating in the absence of a catalyst, the resorcin being present in an amount equal to at least 75% of the total phenolic body, adding about 0.1% to about 2% of a catalyst selected from the group consisting of acid and alkaline catalysts to the reaction mass toward the end of the reaction before any substantial gelation occurs and all the aldehyde is reacted, said percentage being taken on the weight of the phenolic body being reacted, heat reacting the remainder of the aldehyde with the phenolic mixture in the presence of the catalyst, the complete amount of aldehyde present during said steps being only sufficient to produce a permanently fusible resin, the reaction mass being maintained within a temperature range which assists in initiating the reaction and in thereafter continuing the same, and removing water from the resulting liquid resin.

15. The method of producing a permanently fusible resin containing as its essential ingredient a dihydroxy benzenealdehyde resin comprising initiating reaction between a dihydroxybenzene and an aldehyde by heating in the absence of a catalyst, adding about 0.1% to about 2% of a catalyst selected from the group consisting of acid and alkaline catalysts to the reaction mass toward the end of the reaction before any substantial gelation occurs and all of the aldehyde is reacted, said percentage being taken on the weight of the dihydroxy benzene, heat reacting the remainder of the aldehyde with the dihydroxy benzene in the presence of the catalyst, the complete amount of aldehyde reacted during said steps being only sufficient to produce a permanently fusible resin, said reaction mass being maintained within a temperature range which assists in initiating the reaction and in thereafter continuing the same, and removing water from the resulting liquid resin.

16. The method of producing a permanently fusible resin containing as its essential ingredient a resorcin-aldehyde resin comprising initiating reaction between resorcin and an aldehyde by heating in the absence of a catalyst, adding about 0.1% to about 2% of a catalyst selected from the group consisting of acid and alkaline catalysts to the reaction mass toward the end of the reaction before any substantial gelation occurs and all of the aldehyde is reacted, said percentage being taken on the weight of the resorcin, heat reacting the remainder of the aldehyde with the resorcin in the presence of the catalyst, the complete amount of aldehyde reacted during said steps being only sufficient to produce a permanently fusible resin, said reaction mass being maintained within a temperature range which assists in initiating the reaction and in thereafter continuing the same, and dehydrating the resulting mass to a water content of less than 1%.

17. The product of the method of claim 13.
18. The product of the method of claim 14.
19. The product of the method of claim 15.
20. The product of the method of claim 16.

PHILIP HAMILTON RHODES.